Oct. 11, 1966 J. WILLY 3,278,659
METHOD AND APPARATUS FOR CASTING FOAM PLASTIC
SHEETS ON A CURVED CASTING SURFACE
Filed Feb. 26, 1963 3 Sheets-Sheet 1
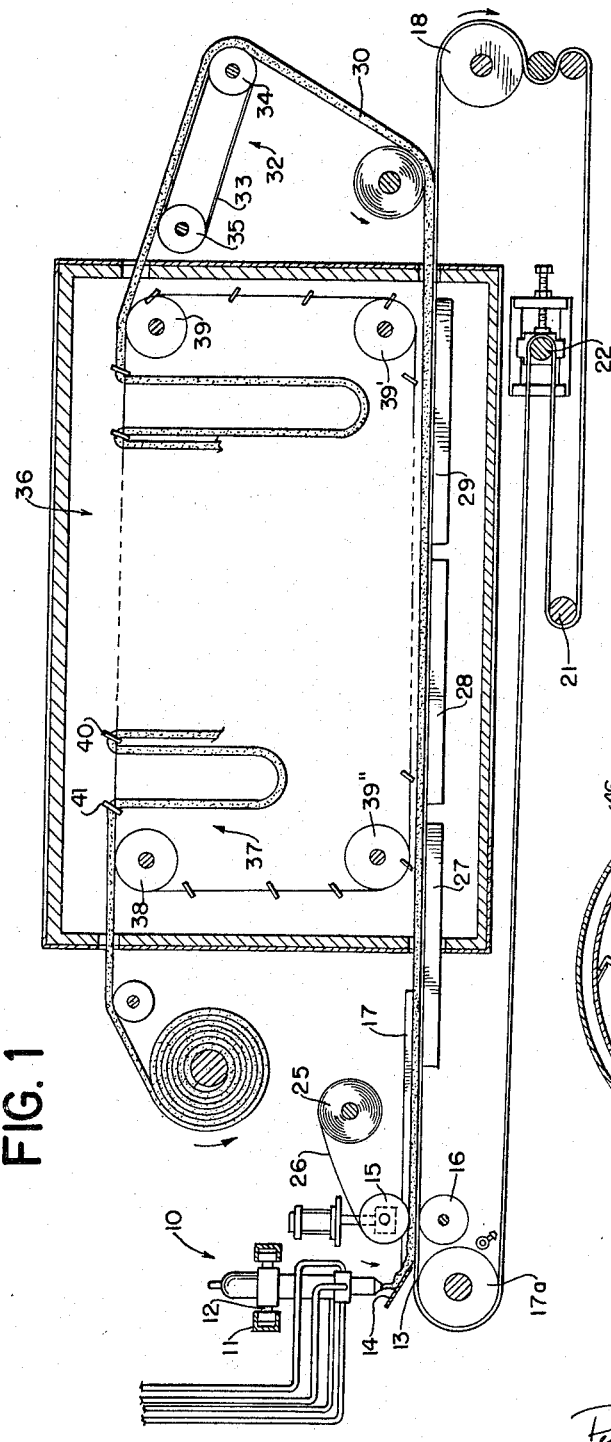
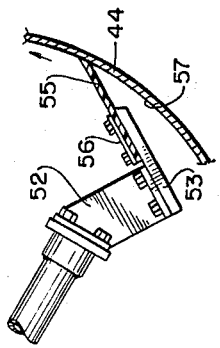
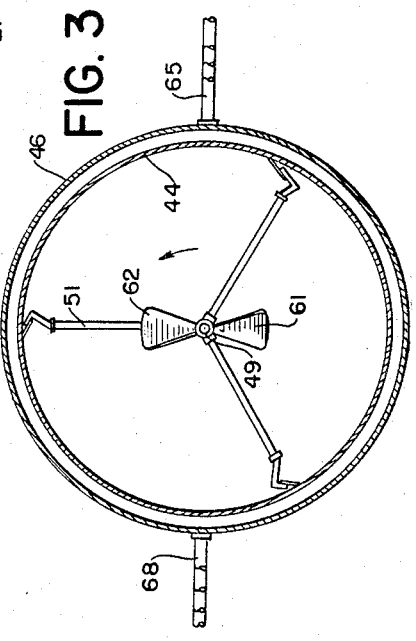
INVENTOR.
JOHN WILLY
BY
ATTORNEYS

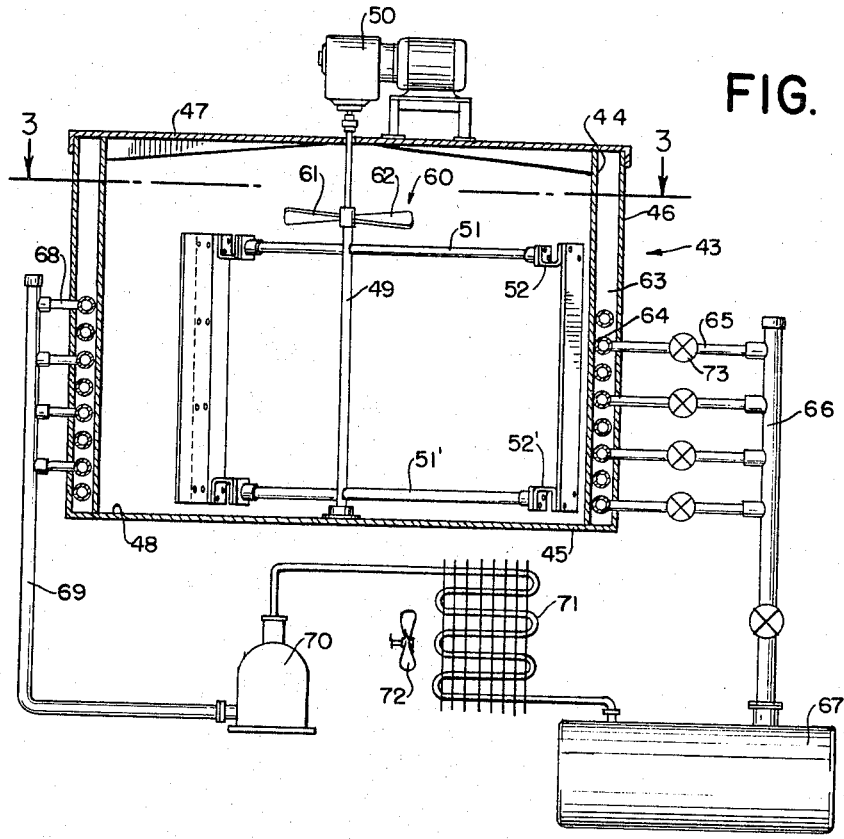
FIG. 2
FIG. 5
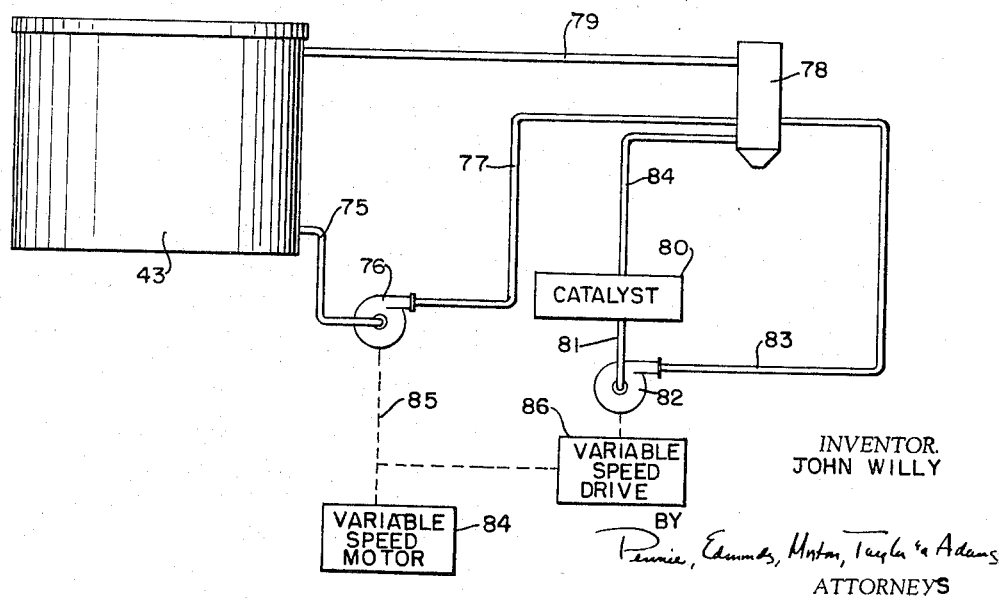
INVENTOR.
JOHN WILLY
BY Pennie, Edmonds, Morton, Taylor & Adams
ATTORNEYS

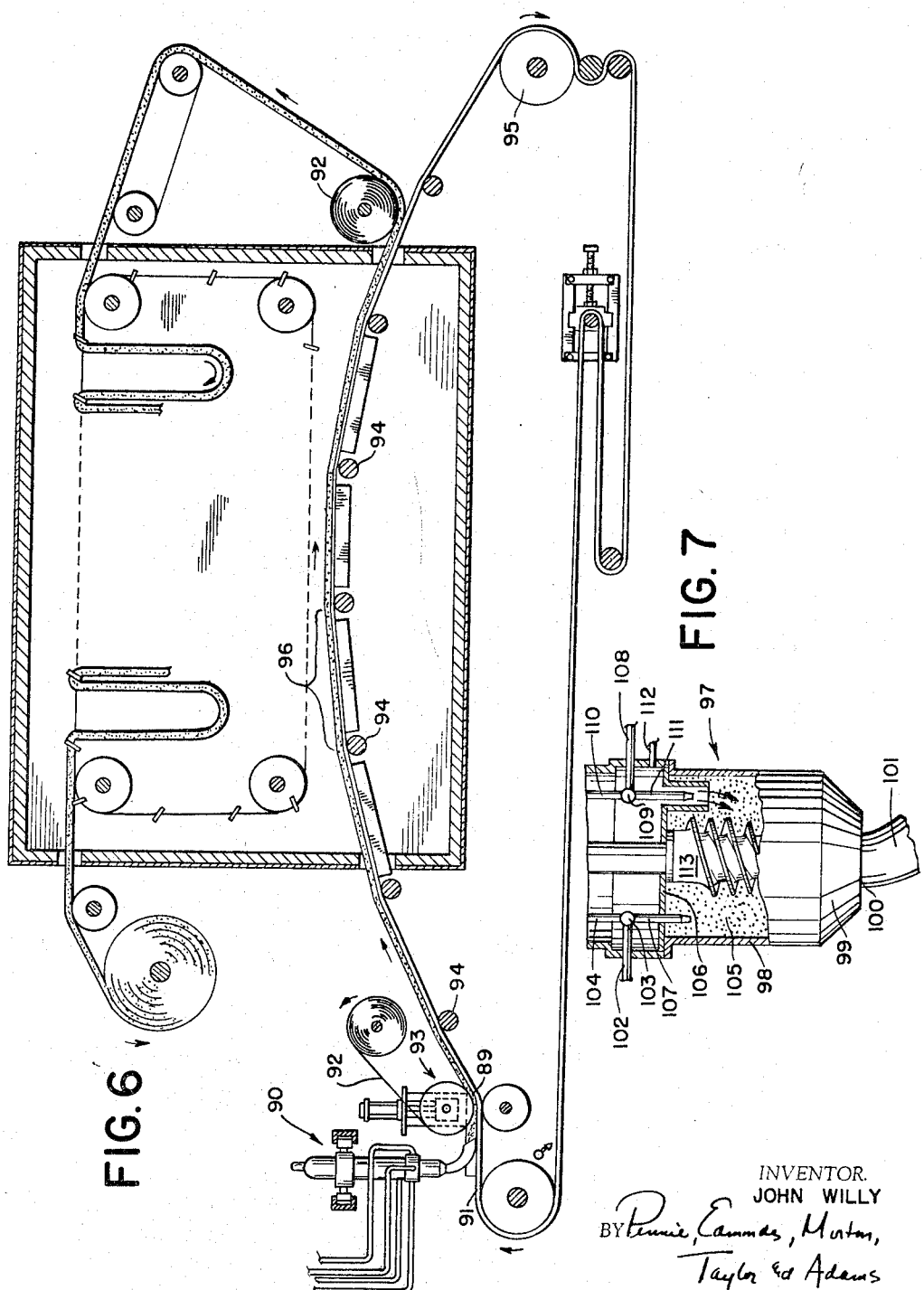

United States Patent Office 3,278,659
Patented Oct. 11, 1966

3,278,659
METHOD AND APPARATUS FOR CASTING FOAM PLASTIC SHEETS ON A CURVED CASTING SURFACE
John Willy, Attleboro, Mass., assignor to Specialty Converters, Inc., a corporation of Delaware
Filed Feb. 26, 1963, Ser. No. 261,040
6 Claims. (Cl. 264—54)

This invention relates to improvements in methods and apparatus for making foam sheets. It particularly relates to feeding means for controlling the feed of a cooled prepolymer and a catalyst to a mixing head which includes circulatory means for independently transferring the prepolymer and catalyst to and from the mixing head, and to circulatory control means for regulating the circulation of prepolymer and catalyst to a mixing head in predetermined relation to each other. More particularly, it relates to the method and apparatus for casting foam sheets on a carrier belt defining a curved casting surface and to a method of depositing dissimilar glomerations of a chemical foaming mixture on a carrier belt.

In casting foam products, such as thin cellular foam sheets, it is imperative that the chemical mixture which is used to create the foam product be accurately controlled prior to being fed into the foam making apparatus. For example, in the casting of thin cellular polyurethane foam sheets, the chemical foaming mixture customarily consists of a prepolymer and a catalyst. It is of course essential that the prepolymer and catalyst be maintained segregated from each other until they are mixed in a mixing head immediately prior to deposition in the foam making apparatus. Moreover, in the manufacture of thin cellular sheets, after the foaming mixture is deposited in the apparatus it is immediately spread to a uniform thickness and passed through a carrier and a cover sheet in the known manner and then allowed to expand between the sheets, thereby forming foam sheets having substantially uniform thickness. In order properly to regulate the thickness of the resultant foam sheet, it is necessary that any immediate chemical reaction between the prepolymer and catalyst be precluded prior to and during the time that the chemical foaming mixture is being spread to a uniform thickness. The longer the time period during which the foam mixture remains dormant as far as any chemical reaction is concerned, the greater the control which can be maintained over the uniformity of the thickness of the spreading of the foam mixture. Although many efforts have been made to retard any reaction between the prepolymer and the catalyst immediately after mixing, particularly by using chemical additives, the most effective and economical manner of accomplishing this has been to cool the prepolymer to a sufficiently low temperature prior to mixing it with a catalyst so that there will be a delayed time during which no reaction will take place. The delay time necessary is dependent upon the temperature to which the prepolymer is cooled below the temperature at which the chemical reaction can take place.

It is an object of the present invention to provide means which give an accurate control of the feeding of a prepolymer and a catalyst through a mixing head so that the resultant advantages discussed above can be realized. Broadly stated, the feeding means of the invention is comprised of a prepolymer reservoir and cooling means associated with the reservoir for maintaining a prepolymer in the reservoir at a predetermined low temperature. A catalyst reservoir is also provided, and operatively connected to the reservoirs are circulatory means for independently transferring the prepolymer and the catalyst to and from the mixing head and the respective reservoirs. Circulatory control means are also included for regulating circulation of prepolymer and catalyst in predetermined relation to each other. The circulatory means of the apparatus permits the prepolymer and the catalyst independently to be circulated to the mixing head and back to their respective reservoirs. Even more importantly, however, is the circulatory control means for regulating the circulation of the prepolymer and the catalyst in predetermined relation to each other. By use of this control means the amount of chemical foaming mixture being deposited in the foam making apparatus can be increased or decreased at will, while still maintaining the proper proportion of prepolymer to catalyst.

The apparatus of the invention also contemplates a unique cooling means for maintaining the prepolymer at a predetermined low temperature. The cooling means is largely comprised of a reservoir tank for holding the prepolymer, with agitating means positioned in the tank to prevent settling and adherence of prepolymer in a portion of the tank. Maintained adjacent to the tank are cooling means which provide cooling of the prepolymer. An outlet and an inlet are provided in the tank through which the prepolymer can be respectively withdrawn and introduced. This cooling apparatus has proven particularly useful in combination with the means described above for maintaining the prepolymer at its desired low temperature and for efficiently feeding the prepolymer in accordance with the apparatus described above.

It has also been noticed that in the customary foam making apparatus, where the carrier belt is pulled along a generally flat plane, there is a tension force set up along the flat carrier surface which tends to cause a narrowing of the belt. When a chemical foaming mixture is deposited on a carrier belt and begins to expand or has expanded but is still tacky, this narrowing of the belt caused the foam to pinch together forming longitudinal wrinkles in the resulting foam sheet. In order to remedy this undesirable wrinkling a method has been developed wherein the chemical foaming mixture is spread on a carrier belt in the usual manner, then the carrier belt with the chemical foaming mixture thereon is moved through a substantially convex path of travel while maintaining the belt taut throughout so as substantially to preclude any longitudinal wrinkling of the foam sheet.

Broadly stated, the apparatus for performing this method is a carrier belt assembly for use in foam making apparatus of the type having a carrier belt which travels from the inlet end to the outlet end of the apparatus with a foaming mixture thereon which changes from its unexpanded state at the inlet end to a fully expanded state at the outlet end of the apparatus. The carrier belt assembly is comprised of a carrier belt and a series of guide members on which the carrier belt rides. The guide members are arranged in longitudinally spaced relationship between the inlet and outlet ends of the apparatus, out of a generally flat plane, so that the belt riding thereon defines a substantially convex carrier surface between the inlet and outlet ends of the apparatus.

It has also been noted that when a mixing head is used which reciprocates across the carrier belt depositing a continuous stream of chemical foaming mixture thereon, the resulting foam sheet has continuous visible markings defining irregular patterns across the width of the sheet. It appears that these markings are not harmful to the cellular structure of the foam itself, but the appearance is such that the sheet would not be of an acceptable quality for many uses. It has been found that these markings can be eliminated by depositing the chemical foaming mixture on the carrier belt in irregular glomerations.

Broadly stated, the method is one of feeding a chemical foaming mixture onto a carrier belt and comprises reciprocating a mixing head across a carrier belt, feeding a prepolymer and catalyst into a mixing head to form a chemical foaming mixture, and depositing the mixture on a carrier belt in dissimilar glomerations. Specifically the above method comprises simultaneously feeding air under pressure into the mixing head with the prepolymer and catalyst. This causes the mixture to be dispensed from the mixing head onto the carrier belt in irregular glomerations.

A preferred embodiment of the invention is described hereinbelow with reference to the drawings wherein:

FIG. 1 is a side elevation partly in section of apparatus for casting thin cellular foam sheets, FIG. 2 is a front section of prepolymer cooling apparatus of the invention;

FIG. 3 is a section taken substantially along lines 3—3 of FIG. 2,

FIG. 4 is an enlarged fragmentary section of a side wall scraper blade in the prepolymer cooling apparatus;

FIG. 5 is a schematic of the circulatory system of the invention,

FIG. 6 is a side elevation partly in section of apparatus having a carrier belt arranged to define a convex carrier surface; and FIG. 7 is a fragmentary elevation partly in section and partly broken away with a mixing head.

The apparatus has proven particularly useful with a common type commercial plastic foam, namely polyurethane, which is formed from a polyisocyanate (especially toluene diisocyanate) and a hydroxy-containing compound (e.g. glycols, polyols, polyesters, or polyethers). The apparatus has been used with a pre-mixed resin comprising a two component polyether-based prepolymer system, e.g. a prepolymer of toluene diisocyanate and an organic compound having two or more diisocyanate reactive groups, with an excess of toluene diisocyanate. To about 100 parts by weight of this pre-mixed resin is added 0.5 part by weight of silicone oil, and this prepolymer mixture is placed in a reservoir and cooled to below 20° F. A catalyst mixture is then prepared and placed into a reservoir; this catalyst mixture can comprise 0.5 part by weight of N, N, N, tetramethylbutane diamine, 1.0 parts of triethylene diamine dissolved in 2.3 parts by weight of distilled water.

Referring initially to FIG. 1, the apparatus shown consists of a mixing head 10 which is mounted on tracks 11 by means of rollers 12 to permit the head to be reciprocated transversely across the width of a carrier belt 13. Underlying the mixing head 10 is a transverse angularly positioned plate 14 onto which the foaming mixture is spread. This plate is preferably amalgamated, thereby presenting a surface which is resistant to foam adherence. This tends to deposit the mixture on the carrier belt 13 more smoothly, thereby presenting a steady supply of unreacted foaming mixture which has less tendency to show any indication in the resultant foam sheet, of the traverse marks often noticeable in foam sheets cast where the foam mixture is deposited from a traversing mixing head. The mixing head 10 feeds the polyurethane foam mixture between on to the carrier belt 13 and between upper metering roll 15 and the carrier belt. Underlying the upper metering roll 15 is a lower metering roll 16. Shown on the respective transverse side edges of the metering rolls are elongated extending edge guide members 17 which serve as additional edge guides to prevent the foam mixture in its fluid state from becoming deposited beyond the width of the carrier belt 13. The carrier belt which functions as a conveyor, is mounted to travel about an idler roll 17a which is positioned at the feed end of the apparatus, and travels on a drive roll 18 positioned at the discharge end of the apparatus. As shown, immediately after passing over the drive roll 18, the continuous belt then travels back toward the feed end of the apparatus and over an intermediate guide roll 21 where its direction is reversed causing the belt to travel once again toward the discharge end of the apparatus. Before reaching the discharge end of the apparatus, the carrier belt travels around a linearly adjustable roll 22 thereby enabling the carrier belt to be lengthened or shortened.

A supply roll 25 is mounted adjacent the mixing head 10 and contains thereon a supply of cover sheeting 26. The cover sheet 26 and the carrier belt 13 are both fed through the nip between the metering rolls such that the foam mixture is contained therebetween. After the cover sheet 26 and the carrier belt 13 pass through the metering rolls 15 and 16, gaseous expansion begins to occur within the foaming mixture contained therein, causing a foam sheet to be formed between the carrier belt and the cover sheet. At this point the expanding mixture is passed through heating zones 27, 28 and 29 to advance the chemical reaction of the mixture and to render the foam sheet self-supporting and non-tacky by the time it passes from the final heating zone 29. The cover sheet is then stripped from the resultant foam sheet 30 and is wound onto a carrier sheet supply roll 31, which is driven by any suitable drive means. The carrier belt 13 is simultaneously stripped from the foam sheet 30 and travels about the carrier sheet drive roll 18. The foam sheet 30 is fed to a smaller conveyor arrangement 32 which consists of a belt 33, an idler roll 34 and a drive roll 35. This conveyor arrangement 32 serves to separate the foam sheet 30 from the carrier belt 13 and the cover sheet 26 and to transfer the foam sheet 30 to a final curing oven 36. The oven 36 is maintained at a temperature high enough to effect final curing of the foam sheet 30. Contained within the oven 36 is a festoon-type conveyor arrangement 37. The festoon-type conveyor arrangement 37 is comprised of a drive pulley 38 and idler pulleys 39, 39' and 39" over which are mounted two continuous parallel chains 40 (one of which is shown). These chains 40 are spaced from each other and support transverse supporting elements 41 which extend across and are supported by the parallel chains 40. The transverse supporting elements 41 are in longitudinal spaced relationship with each other, and accordingly, as the foam sheet 30 is passed through the oven 36, this foam sheet is draped over transverse elements 41 such that a major portion of the foam sheet 30 is allowed to hang in a festoon-like drape between two transverse elements 41.

Referring now to FIGS. 2 to 5, prepolymer cooling apparatus is shown. The apparatus is comprised essentially of a tank 43 which is constructed from an inner cylindrical member 44 which is secured to a base member 45. The base member 45 is of a larger diameter than the cylindrical member 44 and defines the bottom of the inner cylindrical member. Also supported by the base member 45 and having a diameter substantially equal to the diameter of the base member is an outer cylindrical member 46. The outer cylindrical member 46 surrounds the inner cylindrical member 44 and is in concentrically spaced relationship therewith. Extending over the tube portion of the inner and outer cylindrical members is a flanged cover 47. By this construction the inner cyindrical member 44 and base member 45 serve to define a vessel 48 for containing the prepolymer component of the chemical foaming mixture.

A center shaft 49 extends centrally within the vessel 48 through the cover 47 and is journaled in the base of the vessel on the base member 45. A suitable drive motor 50 is mounted on top of the cover 47 and is connected to the end of the center shaft 49 which extends out of the vessel 48 and serves to drive the center shaft at the desired speed. Two arms 51 and 51' extend radially from the center shaft 49 with their outer extremities in spaced relationship with the inner cylindrical member 44. As shown in FIG. 3, in this embodiment there are three pairs of arms extending radially from the center shaft 49 with each pair spaced approximately 120° apart. Attached to the outer extremities of the arms 51 and 51' is a substantial U-shaped bracket 52. As shown in FIG. 2, the U-shaped brackets 52 and 52' and the pair of arms 51 and 51' support an elongated plate 53 which spans the distance between the arms 51 and 51'. As shown in FIG. 4, an elongated polytetrafluoroethylene blade 55 which is held against the plate 53 by means of a supporting strip 56. As shown, the polytetrafluoroethylene blade is in engagement against the inner surface 57 of the inner cylindrical member 44. Although the scraper blade assembly is shown as a rigidly mounted member, it has also been discovered that certain decided advantages can be realized by constructing the blade to pivot so that the engagement against the inner wall will vary with any irregularities which may be present on the inner wall.

Spaced above the arm 51 on the shaft 49 and pinned to the shaft 49 to rotate therewith, is a propeller 60 which consists of a pair of radially extending twisted plates 61 and 62. This propeller 60 tends to prevent the agitated reservoir of prepolymer from becoming too turbulent by maintaining the surface level of the reservoir of prepolymer substantially constant. As will be seen, this apparatus which is attached to the center shaft 49 serves to agitate the prepolymer while it is within the vessel 48, and the polytetrafluoroethylene scraper blade 55 serves to prevent any adherence of prepolymer against the inner wall 57 of the inner cylindrical member 44 which would otherwise occur since the cooling source is located adjacent to the inner cylindrical member.

Positioned within an annular space 63, which is defined between the inner cylindrical member 44 and the outer cylindrical member 46, are a series of refrigeration coils 64. These coils 64 are comprised of elongated lengths of copper tubing or the like which are wound about the inner cylindrical member 44. As shown, coils 64 are arranged in substantially four stages. Four inlet conduits 65 are connected to each stage of the coils 64 and extend outwardly from cylindrical member 46. Each of the inlet conduits 65 is connected to a liquid refrigerant feed conduit 66 which is attached to a tank 67 containing liquid refrigerant. Four outlet conduits 68 extend from the opposite side of the prepolymer tank 43 and are similarly connected to respective stages of the coils 64. Each of the outlet conduits 68 is connected to a vapor refrigerant outlet conduit 69, which in turn is connected to a compressor 70. The vapor compressor serves to compress the gas and pass through the sinusoidal radiator-type tubing 71 over which cool air is passed by means of the fan 72, thereby cooling the vapor to a liquid and returning the liquid to the refrigerant tank 67. Connected between the coils 64 and the liquid-refrigerant conduit 66 along the inlet conduit 65 are thermostatic bulbs 73. These thermostatic bulbs 73 serve automatically to cut off the feeding of the liquid refrigerant into one of the stages of coils at a predetermined pressure. Freon is the refrigerant preferably used and contained within the tank 67. The Freon is passed through the liquid conduits 66 and into the coils 64 through the inlet conduit 65. The Freon circulated through the conduits 64 at for example eighty pounds pressure and the thermostatic bulbs 73 cuts off the introduction of refrigerant once the desired pressure is reached. Freon, which boils at about −10° F. draws the heat from the prepolymer, thereby cooling the prepolymer and causing the Freon to boil and pass vapor out the outlet conduits 68 and through the vapor refrigerant outlet conduit 69, through the compressor 70 where it is compressed and passed through the radiator-type coils 71, through which air is passed to dissipate the heat and re-circulate the refrigerant into the tank 67.

In FIG. 5 the means for circulating the prepolymer and catalyst to and from the mixing head, and the means for controlling the circulation is shown. The prepolymer tank 43 has an outlet line 75 extending therefrom to a pump 76 which pumps the prepolymer through a feed line 77 into the mixing head 78. The mixing head 78 is of the usual type which contains a valve by means of which the prepolymer being fed thereto is discharged through the mixing head or is returned to the prepolymer tank 43 through the return lines 79. Similarly, extending from the catalyst reservoir 80 is an outlet 81 which leads to a pump 82 which serves to pump the catalyst through catalyst feed line 83 and to the mixing head 78. The mixing head 78 contains the second valve means so the prepolymer conveyed thereto can be discharged through the mixing head or re-circulated to the catalyst reservoir 80. Operatively connected to the pump 76 in any customary manner is a variable speed motor 84. The variable speed motor serves to drive the pump 76 directly as indicated by the dotted line 85. Extending from the drive means 85 and operatively connected therewith is a variable speed drive 86. The variable speed drive is operatively connected to the pump 82 and thereby regulates the speed at which the pump is driven.

According to the invention in order to provide a proper mix in the mixing head from the prepolymer to the catalyst it is necessary that some degree of control be maintained over the relative proportions of prepolymer to catalyst which will be fed to the mixing head and subsequently discharged into the foam making apparatus by means in the apparatus described in FIG. 5. The variable speed motor 84 is adjusted to run at the desired speed to pump the correct amount of prepolymer to the mixing head. Then the proportionate amount of catalyst which will be fed to the mixing head is determined and the variable speed drive 86 which is also driven by variable speed motor, is adjusted to pump the desired proportion of catalyst to the mixing head. By this means, once the motor and drive are set to deliver the correct proportion of prepolymer and catalyst, the variable speed motor can be increased or decreased and the correct proportion of prepolymer to catalyst will always be delivered to the mixing head.

The cooling apparatus of the invention is designed to maintain the prepolymer at a temperature below 20° F. As a result, it may be found that an extra cooling coil can advantageously be attached to the outlet line 75, pump 76, and feed line 77 so that the prepolymer may be maintained at the desired low temperature thereby permitting it to be fed to the mixing head at 20° F. or below.

The control which can be maintained over the foam mixture by the apparatus described is particularly useful in combination with apparatus for casting thin cellular foam sheets. In such an operation, the uniformity of the resultant thin sheet cast is very dependent on the control maintained over the foam mixture prior to spreading and metering. Obviously, the new apparatus permits a high degree of control always to be maintained over the foam mixture thereby affording a better opportunity to cast more uniform sheets in a process requiring delicate control.

Referring now to FIG. 6 the apparatus and method for eliminating longitudinal wrinkles in foam sheets is shown. The chemical foaming mixture 89 is prepared in the usual way and is dispensed through the reciprocating mixture head assembly 90 onto a continuous carrier belt 91. The foam mixture is covered with a cover sheet 92 and the carrier belt and cover sheet with the foam mixture contained therein is passed through a metering coil assembly 93. The carrier belt 91 with a foam mixture 89 thereon is then passed in a substantially convex path of travel by passing over a series of guide rollers 94 which are mounted between the inlet end of the apparatus and the outlet end of the apparatus. The guide rollers 94 are displaced substantially out of a generally flat plane and are spaced from each other at progressively higher elevations above horizontal to a high point at substantially midway between the inlet and outlet ends of the apparatus, and then spaced at progressively lower elevations toward the outlet end of the apparatus. By this arrangement, as the carrier belt 91 is pulled over the guide rolls 94 by a drive roll 95 positioned at the outlet end of the apparatus, the carrier belt defines a substantially convex carrier surface. More importantly, the belt 91 is maintained sufficiently taut so that the guide rollers 94 exert a force substantially perpendicular to the carrier belt as it passes over the rollers. This causes the foam carrier belt with the foam 89 thereon, to flatten out between each roller 94, thereby substantially defining flattened portions 96 therein. This flattening indicates the tension necessary to prevent any narrowing of the carrier belt as it is being pulled through the apparatus, and the narrowing being eliminated, any longitudinal wrinkling of the foam sheet is prevented. As shown, the carrier belt is continuous, however, it is also contemplated that the improvements described above can also be used with a carrier sheet, such a paper coated with wax which is dispensed from one roll at the inlet end of the apparatus and is re-wound on another roll at the outlet end of the apparatus.

Referring now to FIG. 7 part of a mixing head 97 is shown. The mixing head 97 consists of an outer substantially cylindrical housing 98 which has a converging portion 99 defining a narrower outlet 100, from which a feeding trough 101 can be attached to facilitate deposition of foam mixture therefrom. As shown a prepolymer inlet tube 102 extends into the housing 98 where it is converted to a valve 103. Branching off from the valve 103 is a return tube 104 for recirculating the prepolymer to its reservoir as described previously and extending into a mixing chamber 105 defined within the housing by the separating plate 106 positioned with the housing is a feed tube 107. A catalyst inlet tube 108 extends into the housing 98 in a similar manner as the prepolymer inlet tube, and is connected to a valve 109. Branching off from the valve 109 is a catalyst re-circulating tube 110 and a catalyst feed tube 111. Also extending into the housing 98 adjacent the catalyst inlet tube 108 is an air inlet tube 112. The catalyst feed tube 111 extends through an opening in the separating plate 106 which is substantially larger than the diameter of the feed tube. Accordingly, as the air is fed into the housing 98 under pressure, it will be fed into the mixing chamber 105. Thus, a secondary purpose is achieved in that the air flowing about the catalyst feed tube 112 will prevent prepolymer from attaching to the orifice of the catalyst feed tube and blocking the flow of catalyst. Concentrically positioned within the housing 98 in the mixing chamber 105 is a screw-type mixer 113 which rotates at sufficient speed to mix the prepolymer and catalyst before deposition through the mixing head.

By introducing air under pressure into the mixing head in the manner described above, the chemical foaming mixture is discharged from the mixing head in varying amounts in the form of dissimilar glomerations. When the chemical foaming mixture is dispensed in this fashion, no noticeable transverse markings were observed.

I claim:

1. In casting thin cellular foam sheets wherein a chemical foaming mixture is spread and allowed to expand on a carrier belt until fully expanded and then is stripped from the carrier belt, the improvement of a method of eliminating longitudinal wrinkles in the foam sheet in combination therewith comprising:
    (a) spreading the chemical foaming mixture on a carrier belt,
    (b) moving the carrier belt with the chemical foaming mixture thereon in a substantially convex path of travel, and
    (c) maintaining the belt taut throughout so as substantially to preclude any wrinkling of the resultant foam sheet in a longitudinal direction.

2. In casting thin cellular foam sheets wherein a chemical foaming mixture is spread and allowed to expand on a carrier belt until fully expanded and then is stripped from the carrier belt, the improvement of a method of eliminating longitudinal wrinkles in the foam sheet in combination therewith comprising:
    (a) spreading the chemical foaming mixture on a carrier belt,
    (b) moving the carrier belt thereon with the chemical foaming mixture over a series of spaced guide members arranged positioned out of a generally flat plane in a substantially convex path of travel, and
    (c) maintaining the belt taut throughout so as to form flat belt portions between said guide members and thereby substantially to preclude any wrinkling of the resultant foam sheet in a longitudinal direction.

3. In foam making apparatus for the continuous casting of thin foam sheets along a moving surface the improvement in feeding means in combination therewith for controlling the feed of a prepolymer and a catalyst of a foaming mixture to a mixing head for deposition into the foam making apparatus comprising:
    (a) cooling means for maintaining the prepolymer at a temperature below that at which the mixture forms comprising:
        (i) a reservoir tank for holding said prepolymer,
        (ii) agitating means positioned in said tank to prevent settling and adherence of prepolymer to a portion of the tank including at least one scraper blade extending adjacent the inner side wall of said tank for scraping prepolymer therefrom,
        (iii) refrigeration means mounted adjacent said tank to provide cooling of the prepolymer,
        (iv) an outlet in said tank through which prepolymer can be withdrawn, and
        (v) an inlet into said tank through which said prepolymer can be introduced;
    (b) a catalyst reservoir;
    (c) circulatory means operatively connected to said reservoirs for independently transferring the prepolymer and the catalyst to and from the mixing head and recirculating back to the respective reservoirs; and
    (d) means for maintaining the prepolymer cooled to a temperature below its reaction temperature as it is fed to the mixing head,
    (e) circulatory control means for regulating the volume of prepolymer and catalyst being circulated while maintaining the proper proportion of prepolymer to catalyst to form foam.

4. In foam making apparatus for the continuous casting of thin foam sheets along a moving surface the improvement in feeding means for controlling the feed of a prepolymer and a catalyst of foaming mixture to a mixing head for deposition onto foam making apparatus and a carrier belt assembly in combination therewith comprising:
    (a) a prepolymer reservoir;
    (b) cooling means for maintaining the prepolymer in the reservoir at a temperature below that at which the mixture forms;
    (c) a catalyst reservoir;
    (d) circulatory means operatively connected to said reservoirs for independently transferring the prepolymer and the catalyst to and from the mixing head and recirculating back to the respective reservoirs;
    (e) circulatory control means operatively connected to said reservoirs for regulating the volume of prepolymer and catalyst being circulated while maintaining the proper proportion of prepolymer to catalyst to form foam;
    (f) a carrier belt extending between the inlet end of the apparatus adjacent the mixing head and the outlet end of the apparatus; and (g) a series of guide members on which said carrier belt rides, said members arranged in longitudinally spaced relationship between the inlet and outlet ends of the apparatus out of a generally flat plane so that the belt riding thereon defines a substantially convex carrier surface between the inlet and outlet ends of the apparatus, said belt maintaining sufficiently taut on said guide members that the portion of the moving belt between said spaced guide members is substantially flat.

5. In foam making apparatus in which a carrier belt travels from the inlet end to the outlet end of the apparatus with a foaming mixture thereon which changes from its unexpanded state at the inlet end to a fully expanded state at the outlet end of the apparatus, and a carrier belt assembly the improvement in combination therewith comprising a carrier belt, and a series of guide members on which said carrier belt rides, said members arranged in longitudinally spaced relationship between the inlet and outlet ends of the apparatus out of a generally flat plane so that the belt riding thereon defines a substantially convex carrier surface between the inlet and outlet ends of the apparatus, the carrier belt being sufficiently taut in relation to said guide members so as to define substantially flat portions of said carrier belt between the spaced guide members.

6. In foam making apparatus in which a carrier belt travels from the inlet end to the outlet end of the apparatus with a foaming mixture thereon which changes from its unexpanded state at the inlet end to a fully expanded state at the outlet end of the apparatus, and a carrier belt assembly the improvement in combination therewith comprising a continuous carrier belt, and a series of rollers on which said carrier belt rides, said rollers arranged in longitudinally spaced relationship between the inlet and outlet ends of the apparatus out of a generally flat plane so that the belt riding thereon defines a substantially convex carrier surface between the inlet and outlet ends of the apparatus.

References Cited by the Examiner

UNITED STATES PATENTS

| | | |
|---|---|---|
| 2,203,596 | 6/1940 | Konig. |
| 2,764,565 | 9/1956 | Hoppe et al. |
| 2,782,458 | 2/1957 | Emmert et al. _____ 18—6 XR |
| 2,788,953 | 4/1957 | Schneider. |
| 2,866,730 | 12/1958 | Potchen et al. |
| 2,898,092 | 8/1959 | De Haven Miller et al. 259—9 XR |
| 2,957,207 | 10/1960 | Roop et al. |
| 3,032,828 | 5/1962 | Bethe et al. |
| 3,081,487 | 3/1963 | Heffner et al. _____ 264—54 XR |
| 3,099,516 | 7/1963 | Henrickson. |
| 3,110,552 | 11/1963 | Voelker. |
| 3,128,995 | 4/1964 | Shaeffer _____ 259—7 XR |
| 3,172,925 | 3/1965 | Preotte _____ 264—54 XR |
| 3,184,419 | 5/1965 | Merriman. |

OTHER REFERENCES

Dupont Bulletin, "Air as a nucleating agent for rigid urethane foam," by R. A. Stengard, Sept. 20, 1962, all pages.

ALEXANDER H. BRODMERKEL, *Primary Examiner.*

P. E. ANDERSON, *Assistant Examiner.*